Patented Oct. 16, 1928.

UNITED STATES PATENT OFFICE.

CHARLES HOFFMAN, OF TUCKAHOE, NEW YORK, AND CHARLES N. FREY AND FRANK MERRILL HILDEBRANDT, OF WARREN, OHIO, ASSIGNORS, BY MESNE ASSIGNMENTS, TO THE FLEISCHMANN COMPANY, OF NEW YORK, N. Y.

METHOD OF CLARIFYING CANE MOLASSES FOR THE GROWING OF YEAST.

No Drawing.      Application filed May 8, 1923. Serial No. 637,586.

This invention relates to the method of clarifying crude cane molasses of the kind known commercially as "black strap" molasses, particularly for the purpose of producing a suitable solution in which baker's yeast may be grown.

Baker's yeast has heretofore been grown chiefly in solutions of grain extracts produced from malted grain. Such extracts form an excellent medium for the production of yeast, but the high prices of grain and of labor recently prevalent have made the cost of yeast a considerable item in the manufacture of bread.

Efforts have been made to provide a cheaper medium for the production of yeast, and it has heretofore been proposed to utilize the waste products of the sugar industry for this purpose, as such products are comparatively cheap and contain the necessary sugar content as well as some of the nitrogen and phosphorus necessary for the requirements of the yeast. It has been found, however, that such products, particularly the cane molasses which is the cheapest and most abundant of the sugar by-products, contain various impurities which are unfavorable to the growth of yeast and also discolor it and impart to it an unpleasant flavor which makes yeast grown in such mediums unsuitable for use in bread. The elimination of such impurities is not so important in the production of spirits, as for baker's yeast where the yeast remains in the bread and where anything which impairs the whiteness of the crumb and flavor of the loaf is objectionable.

In the manufacture of sugar from sugar cane the stalks of the cane as they come from the field are crushed in suitable machines and then run between rollers from which the sugar-containing sap is expressed. The crude juice thus obtained contains various impurities such as particles of the cells and the tissue of the stalk, as well as particles of the leaves and grains of soil. From this juice the sugar is made and the essential steps of the process, briefly described, consist in first adding to the juice a certain amount of lime which precipitates out of the juice certain substances which interfere with the crystallization. The juice is then decolorized, which step is usually carried out by blowing sulfur dioxide through the juice and also by the addition of bone black which absorbs the pigment-containing particles. After this treatment the juice is put through the evaporators or vacuum pans in which the sugar is crystallized out and the remaining concentrated, final residue constitutes the so-called crude molasses.

The molasses so produced contains a large portion of the extraneous matter present in the original juice, together with the mineral substances contained in the raw juice, and in large part, the lime, sulfur compounds and other substances added to the juice during the refining process.

Yeast grown in a solution made from the crude molasses is unfit for use in break-making, for the reasons which we have mentioned above. Efforts to clarify and refine the crude molasses for yeast-growing have heretofore proven unsuccessful, chiefly for the reason that no process has been devised which would at one operation remove all or the majority of the numerous different kinds of foreign substances in the molasses which render it unfit for the growing of baker's yeast, and to subject the molasses to the number of successive processes necessary to remove all the various ingredients, makes the process of clarification more expensive than the production of yeast from suitable grain extracts which are in the main entirely satisfactory for the purpose.

Our invention has for its object to provide a clarifying process for the molasses in which, by a few simple and inexpensive operations the ingredients in the molasses which inhibit the yeast growing or adversely affect the quality of the yeast, are removed, the resulting product of our process being a yeast growing solution of much lower production cost than the malt grain solutions heretofore used, but which will nevertheless produce a yeast of the best quality and of a fermenting power equal to or better than the standard yeast grown in the grain solutions.

The substances in the cane molasses which are deleterious to the clarifying or to the yeast-growing are principally iron, sulfur dioxide, tannins or tannin-like products, dextrins, gums, pigments, clay, and aluminum, if in excessive quantity.

Certain substances in the molasses also interfere with the filtration of the molasses even when diluted 20 to 30 times, and without filtering it is impossible to remove the extraneous impurities such as clay, carbon, and the particles of the stalk and leaves of the cane which are unavoidably present in the molasses. It is also necessary to filter the solution during the yeast manufacturing process and a solution which is difficult or impossible to filter cannot be used even though the yeast produced were of good quality.

A process for the treatment of the molasses for use in the production of yeast must, therefore, conform to a number of conditions. In the first place, the process must not result in the destruction of the sugar. Secondly, the process should leave in the solution all or substantially all of the nitrogenous content and the phosphorus-containing ingredients. Thirdly, the process must be such as to make filtration of the solution easy. Fourthly, the process must be such as to remove the deleterious ingredients without the necessity of repeated and prolonged operations which make the cost of treatment prohibitive; and finally, such substances as are used in the treatment must not themselves be toxic or in any way deleterious to the growth of yeast or of a character which, when the yeast is added to the bread, will constitute foreign matter or impurities in the bread.

Our improved process for the treatment of cane molasses is founded primarily on the discovery that sodium silicate of a composition in which it may be readily obtained in the market, will remove from the molasses solution a number of its aforementioned deleterious ingredients and will also precipitate from the molasses the ingredients which prevent its filtration, whereby the solution after the treatment with the sodium silicate may be readily filtered and the other remaining foreign matter largely removed.

Our process may be carried out in various ways and in the following specification we have pointed out in detail a procedure which we have found in practice results in a solution which will produce a yeast which will mature the dough in a shorter time than the yeast grown in the ordinary grain solution and will also produce a better loaf volume than can be obtained with the standard compressed yeasts now used.

Commercial sodium silicate as obtained on the market is not of a definite chemical composition, the exact composition and the exact proportions of the silicate as such not being well known or easily determinable. Different brands of silicate contain the silicon and sodium in varying proportions and the brands are graded and sold on the basis of the total percent of sodium (calculated as $Na_2O$) and silicon (calculated as $SiO_2$) present. We have found that the brands which are rated comparatively low in $Na_2O$ and comparatively high in $SiO_2$ are preferable for our purposes. Beneficial results may be obtained with any grade of commercial sodium silicate having the $Na_2O$ content within the range of 6 to 18 percent and the $SiO_2$ content from 24 to 40 percent.

The cane molasses to be clarified is diluted by the addition of water preferably not less than three times the volume of the molasses. The degree of dilution may be as great as desired, but it is preferable not to add more water than desired in the solution as it is to be subsequently used for the yeast-growing process.

The quantity of silicate to be added depends largely on the degree of alkalinity of the resulting solution which, in turn, depends on the degree of acidity of the molasses and the composition of the silicate. The limits of alkalinity which we have found feasible, measured by the hydrogen ion determination, are from 7.7 pH to 12 pH.

When the silicate is added a heavy precipitate is formed. The solution containing the silicate is then boiled for several minutes and the material filtered while hot. The resulting filtrate, while still containing some of the coloring material and possibly small amounts of some of the other impurities, is nevertheless suitable for commercial yeast-growing and may be used in lieu of a refined sugar syrup for growing yeast by any process where refined sugar solutions have heretofore been successfully used. When so used any of the various ammonium compounds and phosphorus-containing compounds and other mineral salts heretofore employed may be used to supply the ammonium, phosphorus and mineral requirements for yeast growth.

The clarified molasses solution may also be mixed with malted grain solution. A proportion of 60% clarified molasses solution to 40% grain solution forms a suitable medium for the yeast growth.

While our clarifying process may be varied within certain limits as we have indicated above, we have found the following procedure to give excellent results. The crude cane molasses is diluted with five parts by weight of water to one part of molasses. That is to say, to 200 grams of cane molasses we add 1000 cc. of water. To this solution we add about 25 grams of commercial silicate of approximately the formula $Na_2O$, 8%, $SiO_2$, 30%, the quantity of silicate being varied somewhat with different cane solutions so as to produce a resulting alkalinity equivalent to a pH value of about 8.4. The mixture is heated for several minutes which causes the precipitate to increase in volume and to finally become flocculent and curdy. Also, the boiling drives off volatile substances in the mixture which would give an unpleasant odor to the yeast.

The resulting filtrate may be used for making the yeast-growing solution without further treatment, but we have found that its quality may be improved by certain additional steps in those cases where the original molasses contains impurities, particularly iron and coloring material, in excessive quantities.

The coloring matter may be further reduced by the addition of absorbent carbon which will be removed by filtration, or the solution may be filtered through the carbon. An alkaline carbon may be used or the solution may be made slightly acid and an acid carbon used.

Iron in any form, even in very small amounts, is particularly unfavorable to the yeast. The yield and baking strength are not only reduced but the yeast is dark in color and unsuited for bread-making. This is probably due to the fact that the iron unites with the tannin or tannin-like substances present in the cane solution, producing dark-colored compounds. Where the iron and tannins are present in the molasses in large quantity it is desirable to employ an additional step in the treatment of the molasses solution to assist in the removal of these impurities. One form of treatment which we have found effective is to add to the sugar solution before the silicate is added, small quantities of gelatine or hydrolyzed glue, together with small amounts of ammonium hydroxide or ammonium sulfide. The gelatine or glue serves to throw out some of the tannins while the ammonium compound precipitates a portion of the iron whereby the silicate treatment is rendered more effective.

Since cane molasses or "black strap" is usually acid in reaction and certain preliminary treatments may increase this acidity, it is often desirable to render the molasses alkaline prior to the silicate treatment. This may be done by the addition of ammonium or sodium or other suitable hydroxide or some cheap and suitable phosphate in sufficient quantity to bring the alkalinity to such point that the addition of the sodium silicate will bring the alkalinity of the mixture for filtration to the desired pH value of 8.4. The hydroxide or phosphate also serves the purpose of precipitating the iron compounds and pigments, so that they will be more completely removed by the silicate treatment.

We have described our improved process of clarification in detail, whereby the process may be readily carried out and the best results obtained, but it will be understood that the invention is in no wise limited to such detailed procedure except in so far as defined in the appended claims.

It will be understood, of course, that potassium silicate may be employed in lieu of sodium silicate, if desired, and in substantially the same manner. The cheaper cost of the sodium silicate, however, makes it commercially more suitable for carrying out the process. Although in the foregoing, reference has frequently been made to "sodium silicate" it is to be understood that other alkali metal silicates may be used in place of, or in conjunction therewith. It will also be understood that the term "commercial gelatine" as used in the claims is intended to include such equivalent substances as hydrolyzed glues, and that the terms of the claims are to be generally understood as including such substances as are known to be equivalents for the same or analogous purposes.

We claim:

1. The process of clarifying cane molasses to render it suitable for yeast manufacture, which comprises in adding to a dilute solution of molasses a quantity of sodium silicate sufficient to render the resulting mixture alkaline within the limits represented by a pH value of from 7.7 to 12, then heating the mass and filtering while hot.

2. The process of clarifying cane molasses to render it suitable for yeast manufacture, which comprises in adding to a dilute solution of the molasses a quantity of sodium silicate sufficient to render the resulting mixture alkaline to substantially a pH valuation of 8.4, then heating the mass and filtering while hot.

3. The process of clarifying cane molasses to render it suitable for yeast manufacture, which comprises in adding to a dilute solution of the molasses a quantity of sodium silicate of the formula represented substantially by 8 parts $Na_2O$ to 30 parts $SiO_2$ sufficient to render the resulting mixture to substantially a pH valuation of 8.4, then heating the mass and filtering while hot.

4. The process of clarifying cane molasses to render it suitable for yeast manufacture, which comprises in diluting the molasses with five times its weight of water, adding to the mixture about 2% by weight of commercial sodium silicate of the formula represented substantially by 8% $Na_2O$ and 30% $SiO_2$, boiling the mixture for several minutes and filtering while hot.

5. In a process of clarifying cane molasses to render it suitable for yeast manufacture, the steps which consist in treating the dilute molasses with ammonium hydroxide and gelatine, adding to the mixture a quantity of commercial sodium silicate, and thereafter filtering to remove precipitated and suspended impurities.

6. In a process for the clarification of cane molasses to render it suitable for yeast manufacture, the step which consists in adding commercial gelatine to a dilute molasses solution.

7. The process of clarifying cane molasses to render it suitable for yeast manufacture, which comprises adding to a dilute solution of molasses 2% by weight of sodium silicate of the formula represented substantially by 8% $Na_2O$ and 30% $SiO_2$, boiling the mixture and filtering.

8. The process of clarifying cane molasses having an acid reaction to render it suitable for yeast manufacture, which comprises diluting molasses with five times the quantity of water, adding sodium hydroxide until the solution reacts alkaline, then adding sodium silicate of a formula represented substantially by 8% $Na_2O$ and 30% $SiO_2$ sufficient to give an alkalinity of about pH 8.4, heating the mixture to boiling and filtering while hot.

In testimony whereof we affix our signatures.

CHARLES HOFFMAN.
CHARLES N. FREY.
FRANK MERRILL HILDEBRANDT.